US010789470B2

(12) United States Patent
Yun et al.

(10) Patent No.: US 10,789,470 B2
(45) Date of Patent: Sep. 29, 2020

(54) SYSTEM AND METHOD FOR DETECTING DYNAMIC OBJECT

(71) Applicant: ELECTRONICS AND TELECOMMUNICATIONS RESEARCH INSTITUTE, Daejeon (KR)

(72) Inventors: Ki Min Yun, Daejeon (KR); Yong Jin Kwon, Daejeon (KR); Jin Young Moon, Daejeon (KR); Sung Chan Oh, Daejeon (KR); Jong Youl Park, Daejeon (KR); Jeun Woo Lee, Gyeryong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 201 days.

(21) Appl. No.: 16/033,152

(22) Filed: Jul. 11, 2018

(65) Prior Publication Data

US 2019/0019031 A1 Jan. 17, 2019

(30) Foreign Application Priority Data

Jul. 12, 2017 (KR) .................. 10-2017-0088650
Jul. 6, 2018 (KR) .................. 10-2018-0078599

(51) Int. Cl.
*G06K 9/00* (2006.01)
*G06T 7/194* (2017.01)
(Continued)

(52) U.S. Cl.
CPC ..... *G06K 9/00664* (2013.01); *G06K 9/00744* (2013.01); *G06T 7/194* (2017.01); *G06T 7/251* (2017.01); *G06T 7/254* (2017.01); *G06T 2207/10016* (2013.01); *G06T 2207/20224* (2013.01)

(58) Field of Classification Search
None
See application file for complete search history.

(56) References Cited

U.S. PATENT DOCUMENTS 7,457,472 B2 * 11/2008 Pace ................. G06K 9/38
382/103
8,933,797 B2 1/2015 Deigmoller et al.
(Continued)

FOREIGN PATENT DOCUMENTS

KR 10-2014-0052256 A 5/2014

OTHER PUBLICATIONS

Soo Wan Kim et al., "Detection of moving objects with a moving camera using non-panoramic background model", Machine Vision and Applications, 2013, pp. 1015-1028, vol. 24. Kwang Moo Yi et al., "Detection of Moving Objects with Non-Stationary Cameras in 5.8ms: Bringing Motion Detection to your Mobile Device", IEEE Computer Society, 2013 IEEE Conference on Computer Vision and Pattern Recognition Workshops, pp. 27-34.
(Continued)

*Primary Examiner* — Soo Shin
(74) *Attorney, Agent, or Firm* — Rabin & Berdo, P.C.

(57) ABSTRACT

Provided is a dynamic object detecting technique, and more specifically, a system and method for determining a state of a motion of a camera on the basis of a local motion estimated on the basis of a video captured by a dynamic camera and a result of analyzing a global motion, flexibly updating a background model according to the state of the motion of the camera, and flexibly detecting a dynamic object according to the state of the motion of the camera.

18 Claims, 11 Drawing Sheets

(51) Int. Cl.
*G06T 7/246* (2017.01)
*G06T 7/254* (2017.01)

(56) References Cited

U.S. PATENT DOCUMENTS

| | | | | |
|---|---|---|---|---|
| 2007/0297645 | A1* | 12/2007 | Pace | G06K 9/00711 382/103 |
| 2010/0134632 | A1* | 6/2010 | Won | G06K 9/32 348/169 |
| 2012/0177121 | A1* | 7/2012 | Tripathi | G06T 7/20 375/240.16 |
| 2013/0169822 | A1* | 7/2013 | Zhu | G06T 7/80 348/180 |
| 2015/0146928 | A1* | 5/2015 | Kim | G06T 7/251 382/103 |

OTHER PUBLICATIONS

Kimin Yun et al., "Robust and Fast Moving Object Detection in a Non-Stationary Camera Via Foreground Probability Based Sampling", ICIP 2015, pp. 4897-4901.

Kimin Yun et al., "Attention-Inspired Moving Object Detection in Monocular Dashcam Videos", 2016 23$^{rd}$ International Conference on Pattern Recognition (ICPR), Cancún, México, Dec. 4-8, 2016, pp. 2706-2711.

Kimin Yun et al., "Scene conditional background update for moving object detection in a moving camera", Pattern Recognition Letters, 2017, pp. 57-63, vol. 88.

Kimin Yun, "Background-Centric Approach for Moving Object Detection in Moving Cameras", Department of Electrical Engineering and Computer Science, College of Engineering, Seoul National University, Feb. 2017.

\* cited by examiner

SYSTEM AND METHOD FOR DETECTING DYNAMIC OBJECT

CROSS-REFERENCE TO RELATED APPLICATION

This application claims priority to and the benefit of Korean Patent Application No. 10-2018-0078599, filed on Jul. 6, 2018, the disclosure of which is incorporated herein by reference in its entirety.

BACKGROUND

1. Field of the Invention

The present disclosure relates to a dynamic object detecting technique, and more specifically, to a system and method for detecting a dynamic object in a video captured by a dynamic camera.

2. Discussion of Related Art

As cameras are becoming smaller in size and prices thereof are decreasing, the cameras have been used by being attached to various types of devices. Accordingly, research has been actively conducted on a computer vision field in which a computer obtains information from a video captured by a camera and parses the information.

Methods of detecting a dynamic object in a video may be largely classified into an object-oriented approach and a background-oriented approach.

When the object-oriented approach is used to detect a dynamic object in a video, there are restraints. For example, this approach is based on an assumption that a main object included in the video is positioned at a central part of the video, and information regarding the main object should be provided at the start of the video.

In contrast, the background-oriented approach exhibits high performance with respect to videos in various environments without any assumptions or major restraints when this approach is applied to a static camera but exhibits low performance when this approach is applied to a dynamic camera due to many parameters in a dynamic environment.

Thus, when the background-oriented approach is applied to a dynamic camera, a module is additionally needed to estimate a motion of the camera so as to improve performance.

However, even if such a module is added, the motion of the camera may be inaccurately estimated. When the motion of the camera is inaccurately estimated, detecting a dynamic object may fail or a non-object region may be erroneously detected as a dynamic object.

SUMMARY OF THE INVENTION

To address such problems of the related art, the present disclosure is directed to a system and method for determining a camera motion state on the basis of a result of analyzing a local motion and a global motion estimated on the basis of a video captured by a dynamic camera, flexibly updating a background model according to the camera motion state, and then detecting a dynamic object.

According to an embodiment of the present disclosure, a dynamic object detecting system includes at least one memory storing a program, and at least one processor configured to be operated according to the program stored in the memory.

The processor includes a video extracting engine configured to extract video frames from an input video stream according to a sampling period; a local motion estimating engine configured to estimate a local motion by analyzing two video frames from the video extracting engine; a global motion estimating engine configured to estimate a projection matrix on the basis of information regarding the local motion from the local motion estimating engine; a camera motion determining engine configured to determine a state of a motion of a camera on the basis of the information regarding the local motion and the projection matrix; a background model updating engine configured to variably estimate a background model according to camera motion state information from the camera motion determining engine; and a dynamic object detecting engine configured to detect a dynamic object from the video frames according to the camera motion state information.

According to an embodiment of the present disclosure, a dynamic object detecting method is performed by a processor operated according to a dynamic object detecting program stored in at least one memory.

The dynamic object detecting method includes extracting video frames from an input video stream according to a sampling period; estimating a local motion by analyzing two video frames among the extracted video frames; estimating a projection matrix on the basis of information regarding the estimated local motion; determining a state of a motion of a camera on the basis of the information regarding the estimated local motion and the projection matrix; flexibly updating a background model on the basis of information regarding the determined state of the motion of the camera; and flexibly detecting a dynamic object from the video frames on the basis of the information regarding the determined state of the motion of the camera.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 6A to 6C are diagrams illustrating a state in which noise is removed when a dynamic object is detected by taking into consideration a matching error, the detection performed by a dynamic object detecting system according to an embodiment of the present disclosure, in which FIG. 6A illustrates an input image, FIG. 6B illustrates a result of detecting a dynamic object without removing noise related to the matching error, and FIG. 6C illustrates a result of detecting a dynamic object after removing the noise related to the matching error;

FIGS. 7A to 7C are diagrams illustrating an example of results of detecting a dynamic object from an input image before and after a dynamic object detecting technique according to an embodiment of the present disclosure is applied, in which FIG. 7A illustrates the input image, FIG. 7B illustrates a result of detecting a dynamic object from the input image before the dynamic object detecting technique is applied, and FIG. 7C illustrates a result of detecting a dynamic object from the input image after the dynamic object detecting technique is applied;

FIGS. 8A to 8C are diagrams illustrating another example of results of detecting a dynamic object from an input image before and after a dynamic object detecting technique according to an embodiment of the present disclosure is applied, in which FIG. 8A illustrates the input image, FIG. 8B illustrates a result of detecting a dynamic object from the input image before the dynamic object detecting technique is applied, and FIG. 8C illustrates a result of detecting a dynamic object from the input image after the dynamic object detecting technique is applied.

DETAILED DESCRIPTION OF EXEMPLARY EMBODIMENTS

Figure 1:
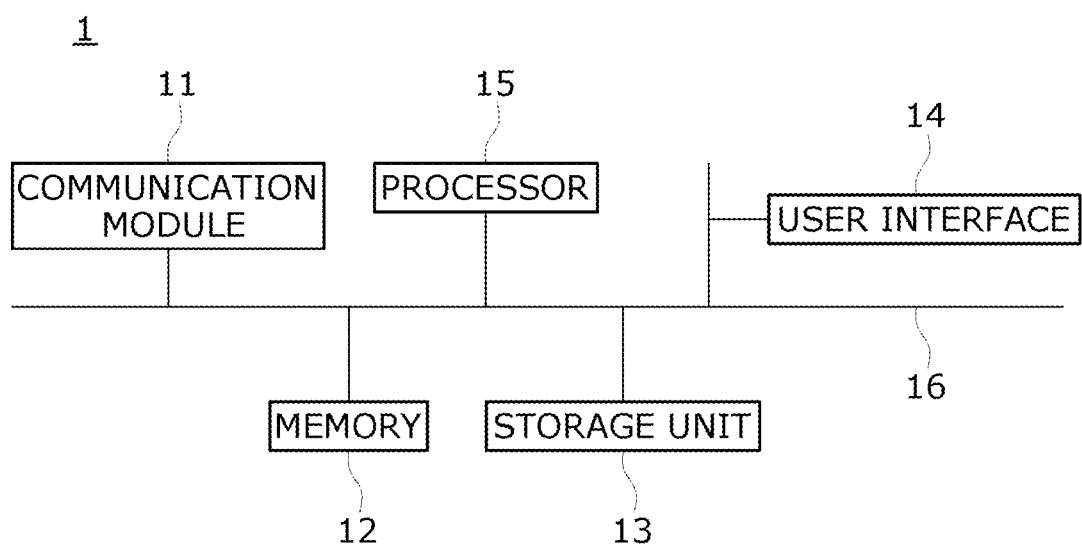
FIG. 1 is a block diagram illustrating a structure of an example of a dynamic object detecting system according to an embodiment of the present disclosure.

The following description of specific structures or functions of embodiments set forth herein are merely provided to explain embodiments of the present disclosure. Thus, embodiments of the present disclosure may be implemented in various forms and should not be construed as being limited to the embodiments set forth herein.

Various changes may be made in the present disclosure and the present disclosure may be embodied in many different forms. Thus, exemplary embodiments are illustrated in the drawings and will be described in detail herein. However, the present disclosure is not limited thereto and should be understood to cover all changes, equivalents, and alternatives falling within the idea and technical scope of the present disclosure.

It will be understood that, although the terms first, second, third, etc. may be used herein to describe various components, the components should not be limited by these terms. These terms are only used to distinguish one component from another component. For example, a first component discussed below could be termed a second component without departing from the teachings of the present disclosure. Similarly, a second component could be termed a first component.

It will be understood that when a component is referred to as being "coupled to" or "connected to" another component, the component can be directly coupled or connected to the other component but another component may be present between the component and the other component. In contrast, when a component is referred to as being "directly coupled to" or "directly connected to" another component, there are no intervening components. Other terms describing the relationship between components, e.g., "between" and "right between" or "neighboring to" and "directly neighboring to", should be understood in the same way.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that terms such as "comprise" and "comprising," when used in this specification, specify the presence of state d features, integers, steps, operations, components, components, or a combination thereof, but do not preclude the presence or addition of one or more other features, integers, steps, operations, components, components, or a combination thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When an embodiment may be implemented differently, functions or operations specified in specific blocks may be performed in an order different from that specified in a flowchart. For example, functions or operations specified in two consecutive blocks may actually be performed simultaneously or may be performed in a reverse order according to a function or operation related thereto.

Hereinafter, a dynamic object detecting system and method will be described in detail with reference to the accompanying drawings.

FIG. 1 is a diagram illustrating a structure of an example of a dynamic object detecting system according to an embodiment of the present disclosure.

Referring to FIG. 1, a dynamic object detecting system 1 according to an embodiment of the present disclosure may include at least one communication module 11 configured to communicate with an external device, at least one memory 12 and at least one storage unit 13 which are configured to store an algorithm (or a program) needed to perform a function, a result of performing the function, etc., a user interface 14 configured to interface with a user, at least one processor 15 configured to perform the function, and so on.

The above-described components 11 to 15 may be embodied to transmit or receive data via an internal communication bus 16 of a system 10.

The communication module 11 is configured to communicate with an external device (e.g., a camera) and may be embodied to establish communication using various communication methods according to the design of the dynamic object detecting system 1.

The memory 12 and the storage unit 13 are configured to store an algorithm (or a program) needed to perform a function of the processor 15, a result of operating the processor 15, etc.

The memory 12 and the storage unit 13 may include various types of volatile or nonvolatile storage media.

The memory 12 may include a read-only memory (ROM) and a random access memory (RAM). The storage unit 13 may include a NAND flash memory such as a compact flash (CF) card, a secure digital (SD) card, a memory stick, a solid-state drive (SSD), and a micro-SD card, a magnetic computer memory device such as a hard disk drive (HDD), an optical disc drive such as a compact-disc (CD)-ROM and a digital versatile disc (DVD)-ROM, and so on.

The user interface 14 is configured to interface with a user and may include an input device and an output device.

The processor 15 is configured to receive a video from the outside (e.g., a camera) and detect a dynamic object included in the received video.

The processor 15 may load an algorithm (or a program) needed to perform the function from the memory 12 outside the processor 15 to perform a function and may include at least one engine to perform the function.

Optionally, the processor 15 may include a memory storing an algorithm (or a program) needed to perform a function and load the algorithm (or the program) stored in the memory to perform the function.

Figure 2:
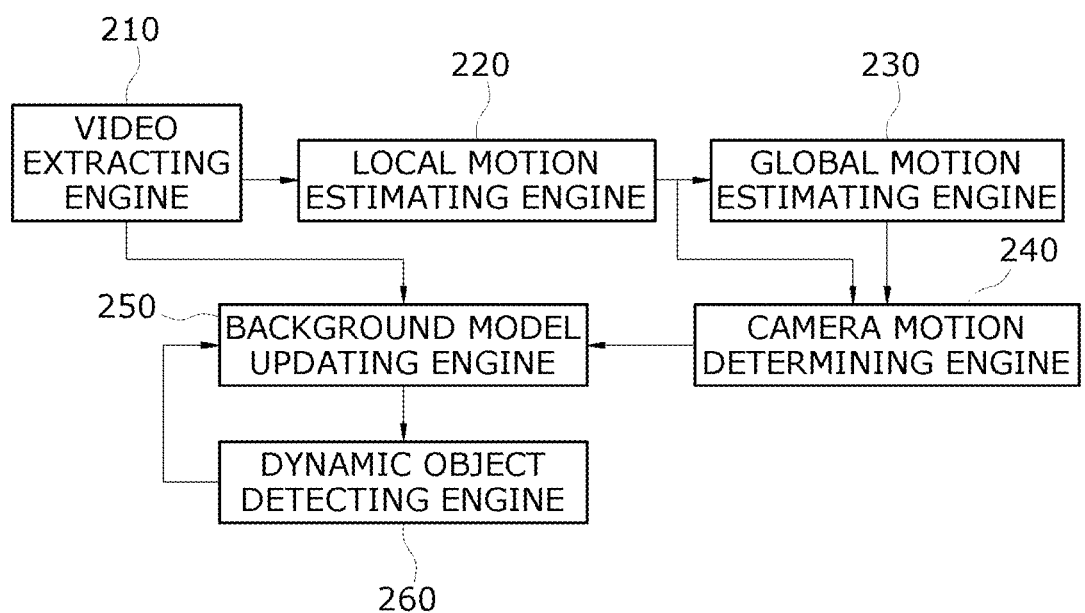
FIG. 2 is a detailed block diagram illustrating a processor of a dynamic object detecting system in terms of functions thereof according to an embodiment of the present disclosure.

FIG. 2 is a detailed block diagram illustrating a processor of a dynamic object detecting system in terms of functions thereof according to an embodiment of the present disclosure.

A processor 200 illustrated in FIG. 2 may be operated according to a predetermined dynamic object detecting program, correspond to the processor 15 of FIG. 1, and include a video extracting engine 210, a local motion estimating engine 220, a global motion estimating engine 230, a camera motion determining engine 240, a background model updating engine 250, and a dynamic object detecting engine 260.

The video extracting engine 210, the local motion estimating engine 220, the global motion estimating engine 230, the camera motion determining engine 240, the background model updating engine 250, and the dynamic object detecting engine 260 are illustrated as being included in one processor 200 in the present embodiment, but may be included in a plurality of processors.

The video extracting engine 210 extracts two consecutive video frames from a video stream input from a video capturing device according to a predetermined sampling period.

The video frames extracted by the video extracting engine 210 are output to the local motion estimating engine 220.

The local motion estimating engine 220 estimates a local motion by comparing a brightness value of an image at first coordinates (x,y) on a first video frame with that of an image at second coordinates (x+u,y+v) on a second video frame. The image at the first coordinates (x,y) is moved by coordinates (u,v) to the second coordinates (x+u,y+v) for the sampling period.

That is, the image at the first coordinates (x,y) on the first video frame is moved to the second coordinates (x+u,y+v) on the second video frame and thus the image at the second coordinates (x+u,y+v) on the second video frame corresponds to the image at the first coordinates (x,y) on the first video frame.

If it is assumed that a brightness value of the image is maintained even when the image at the first coordinates (x,y) is moved to the second coordinates (x+u,y+v) due to a local motion and the first video frame is captured at a point in time t and the second video frame is captured at a point in time (t+1), the relationship between a brightness value I(x,y,t) at the first coordinates (x,y) on the image captured at the point in time t and a brightness value I(x+u,y+v,t+1) at the second coordinates (x+u,y+v) on the image captured at the point in time (t+1) is expressed by Equation 1 below.

$$I(x,y,t)=I(x+u,y+v,t+1) \quad \text{[Equation 1]}$$

In Equation 1, coordinates (u,v) may be understood as a value of a motion of the image at the first coordinates (x,y) on the first video frame.

That is, the image at the first coordinates (x,y) on the first video frame may be understood as being moved by the coordinates (u,v) for the sampling period.

Here, since the two unknown numbers u and v are included in one equation, a result of approximating the coordinates (u,v) is calculated on the basis of an assumption that the local motion shows a similar pattern in a neighboring region.

The local motion estimating engine 220 may be operated according to various algorithms to estimate the local motion. For example, a feature tracking algorithm may be used to estimate the local motion.

The global motion estimating engine 230 estimates a projection matrix, which is information regarding a global motion (or a camera motion) on the basis of information regarding the estimated local motion.

That is, the projection matrix estimated by the global motion estimating engine 230 is information regarding the global motion (or the camera motion).

As used herein, the terms "global motion information," "camera motion information," and "projection matrix" should be understood as the same information.

When the coordinates of the image of the first video frame at the point in time t are expressed as $X=(x,y,1)^T$, the coordinates of the image of the first video frame at the point in time t may be expressed as coordinates $X'=(x+u,y+v,1)^T$ on the second video frame at the point in time (t+1).

The global motion estimating engine 230 may estimate a projection matrix H according to Equation 2 below.

$$X'=H \times X \quad \text{[Equation 2]}$$

The camera motion is not constant, and for example, a camera may be moved forward, turned quickly, and then moved in a horizontal direction, or may be moved in a certain direction and then suddenly stopped.

Accordingly, a method of updating a background, after analyzing a motion of a camera whenever the camera is moved, is needed.

It is more difficult to estimate a global motion of the camera (or estimate the projection matrix H) when the camera is moved forward or backward than that when the camera is moved in the horizontal direction or a vertical direction.

Thus, a method of updating a background by identifying the motion of the camera is needed, and a method of fixing a problem caused due to a drastic motion of the camera or an error occurring when a video is obtained is needed.

Thus, according to an embodiment of the present disclosure, the camera motion determining engine 240 determines a state of a motion of a camera on the basis of estimated local motion information and global motion information and outputs a result of determining the state of the motion of the camera to the background model updating engine 250.

Figure 3:
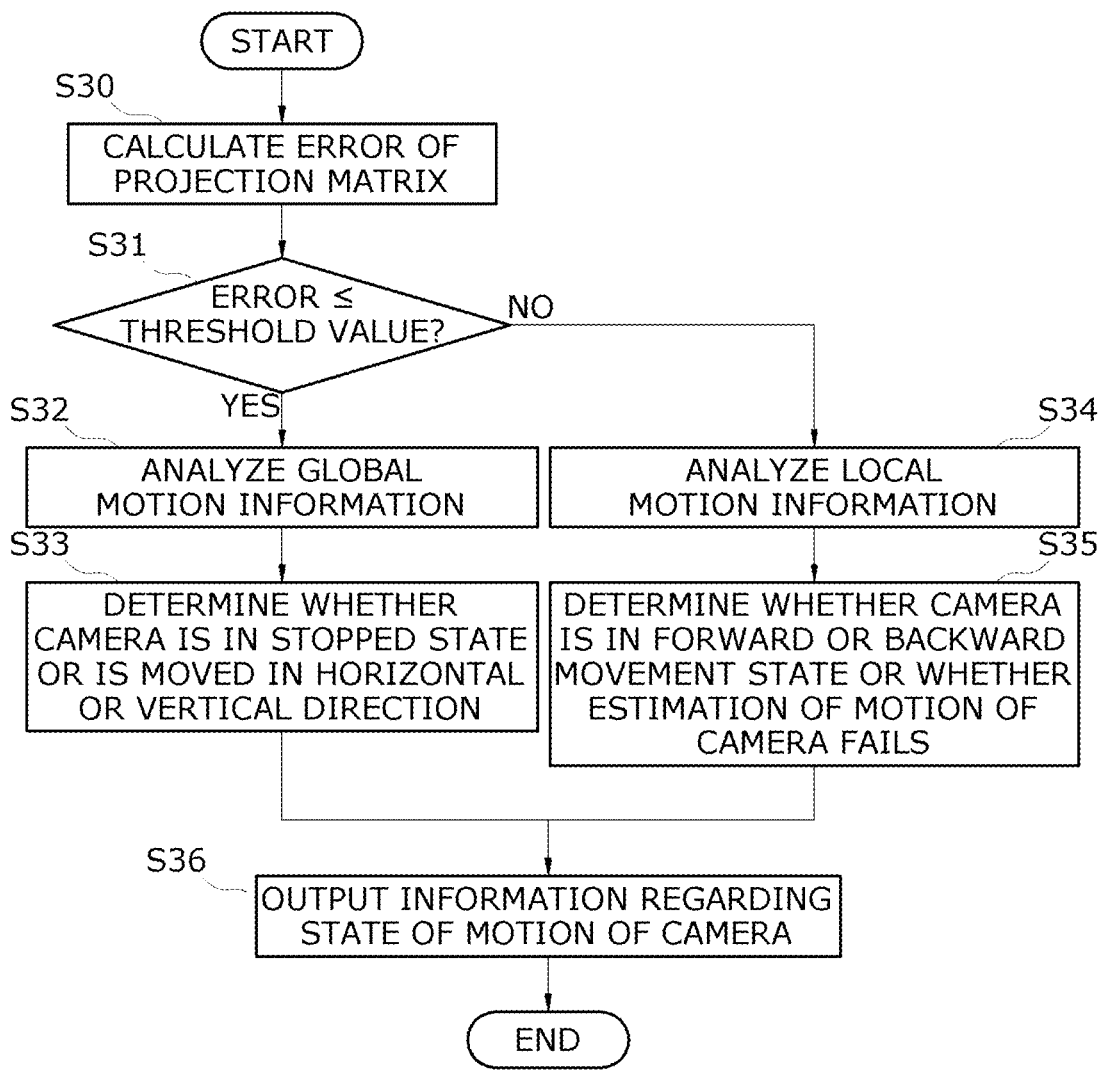
FIG. 3 is a flowchart illustrating an operation of a camera motion determining engine of a dynamic object detecting system according to an embodiment of the present disclosure.

FIG. 3 is a flowchart illustrating an operation of a camera motion determining engine of a dynamic object detecting system according to an embodiment of the present disclosure.

Referring to FIG. 3, the camera motion determining engine 240 calculates an error e of a projection matrix H by using Equation 3 below (operation S30).

$$e = \sum_{t=1}^{N} (X_t^i - HX_t) \quad \text{[Equation 3]}$$

(Here, i denotes an index of a pixel in a video frame)

That is, the camera motion determining engine 240 calculates the error e with respect to all pixels i of the video frame.

Then, the camera motion determining engine 240 calculates the calculated error e with a predetermined threshold value to determine whether the error e is equal to or less than the threshold value (operation S31).

When it is determined in operation S31 that the error e is equal to or less than the threshold value (in the case of 'yes' in operation S31), the camera motion determining engine 240 analyzes global motion information (operation S32).

The camera motion determining engine 240 determines whether a camera is in a stopped state (a 'first state') or is moved in a horizontal or vertical direction (or a 'second state') according to a result of analyzing the global motion information in operation S32 (operation S33).

In detail, the camera motion determining engine 240 calculates a ratio of an area of an image ('a newly appearing image'), which is included in a video frame captured at a second point in time (a point in time (t+1)) but which is not included in a video frame captured at a first point in time (a point in time t), to an entire image area, and determines that the camera is in the stopped state (the 'first state') when the calculated ratio is equal to or less than a predetermined reference ratio.

When the calculated ratio is greater than the predetermined reference ratio, the camera motion determining engine 240 determines whether the newly appearing image is located at an upper, lower, left, or right portion of the video frame to determine whether the camera is moved in the horizontal or vertical direction (whether the camera is in the 'second state').

When it is determined in operation S31 that the error e is greater than the threshold value (in the case of 'no' in operation S31), the camera motion determining engine 240 determines a degree of divergence of a local motion by analyzing local motion information (operation S34).

Through the determination of operation S34, the camera motion determining engine 240 determines whether the camera is in a forward or backward movement state (a 'third state') or whether estimation of a motion of the camera fails (a 'fourth state') (operation S35).

That is, the camera motion determining engine 240 determines the state of the motion of the camera on the basis of the comparison of the calculated error e with the predetermined threshold value, the analysis of the global motion information, and the analysis of the local motion information.

The camera motion determining engine 240 outputs information regarding the state of the motion of the camera to the background model updating engine 250 (operation S36).

Furthermore, when a case in which the camera motion state is the fourth state repeatedly occurs for a predetermined time or in a predetermined number of frames or more, the camera motion determining engine 240 may transmit a background initialization command to the background model updating engine 250 and the background model updating engine 250 may initialize a background model and update the background model in a state in which a first frame after the initialization of the background model is set to a background initial value.

Alternatively, the camera motion determining engine 240 may transmit the background initialization command via an additional control component (not shown), and the control component may control the background model updating engine 250 to initialize the background model and update the background model in a state in which the first frame after the initialization of the background model is set to the background initial value.

The background model updating engine 250 flexibly updates the background model according to the information regarding the state of the motion of the camera from the camera motion determining engine 240.

In detail, when the state of the motion of the camera is the first state, the background model updating engine 250 updates the background model according to a background modeling algorithm selected from among well-known various background modeling algorithms.

For example, the background model updating engine 250 may update the background model by using a background modeling algorithm using a Gaussian distribution.

The background model updating engine 250 may update the background model according to Equations 4 and 5 below.

Here, $\mu$ denotes a background color, and $\sigma$ denotes how stably the background color changes ('stability of a change in the background color').

$$\mu_i^{(t)} = (1-\alpha)\mu_i^{(t-1)} + \alpha I_i^{(t)} \qquad \text{[Equation 4]}$$

$$\sigma_i^{2(t)} = (1-\alpha)\sigma_i^{2(t-1)} + \alpha(I_i^{(t)} - \mu_i^{(t-1)})^2 \qquad \text{[Equation 5]}$$

Here, i denotes an index of a pixel in a video frame, $\alpha$ denotes a learning rate which is a fixed value, $\mu_i^{(t)}$ denotes a current average brightness value, $\mu_i^{(t-1)}$ denotes a previous average brightness value, $I_i^{(t)}$ denotes an input current brightness value, $\sigma_i^{2(t)}$ denotes dispersion of the current brightness value, and $\sigma_i^{2(t-1)}$ denotes dispersion of a previous brightness value.

When the state of the motion of the camera is the second state, the background model updating engine 250 updates the background model by changing the background color and the stability of the change in the background color on the basis of a reciprocal of an age value of the newly appearing image.

Here, the age value denotes a time elapsed after the appearance of the newly appearing image.

In this case, the background model updating engine 250 updates the background model according to Equations 6 to 8 below.

$$\mu_i^{(t)} = \frac{\tilde{\alpha}_i^{(t-1)}}{\tilde{\alpha}_i^{(t-1)} + 1} \tilde{\mu}_i^{(t-1)} + \frac{1}{\tilde{\alpha}_i^{(t-1)} + 1} I_i^{(t)} \qquad \text{[Equation 6]}$$

$$\sigma_i^{2(t)} = \frac{\tilde{\alpha}_i^{(t-1)}}{\tilde{\alpha}_i^{(t-1)} + 1} \tilde{\sigma}_i^{2(t-1)} + \frac{1}{\tilde{\alpha}_i^{(t-1)} + 1} (I_i^{(t)} - \mu_i^{(t-1)})^2 \qquad \text{[Equation 7]}$$

$$\alpha_i^{(t)} = \tilde{\alpha}_i^{(t-1)} + 1 \qquad \text{[Equation 8]}$$

Here, i denotes an index of a pixel in a video frame, $\tilde{\alpha}_i^{(t-1)}$ denotes an age value of the pixel, the coordinates of which are moved by applying a projection matrix to a pixel at a previous point in time (a point in time t−1), $\alpha_i^{(t)}$ denotes an age value at a present point in time (a point in time t), $\mu_i^{(t)}$ denotes a current average brightness value, $\tilde{\mu}_i^{(t-1)}$ denotes a previous average brightness value, $I_i^{(t)}$ denotes an input current brightness value, $\sigma_i^{2(t)}$ denotes dispersion of the current brightness value, $\tilde{\sigma}_i^{2(t-1)}$ and denotes dispersion of a previous brightness value.

When a method applied when the state of the motion of the camera is the second state (the horizontal or vertical movement state) is applied in the third state (the forward or backward movement state) of the motion of the camera, detection of an object may fail or be erroneously performed due to physical limitations of a projection matrix equation representing a global motion.

The reason why the detection of the object fails or is erroneously performed is because an age value-based background model updating method is difficult to efficiently apply to a forward or backward movement through which only a part of a side surface of the object newly appears and thus an age value continuously increases.

The third state of the motion of the camera is determined on the basis of a radial pattern determined by analyzing a local motion of the camera and thus the background model updating engine 250 updates a background model of an outer portion of an image by using information (i.e., the radial pattern) used to determine the third state of the motion of the camera.

That is, the background model updating engine 250 updates the background model of the outer portion of the image by using the degree of divergence of the local motion (the radial pattern) determined by the camera motion determining engine 240.

To this end, a method of increasing a speed of updating side surface portions of an image is used in the dynamic object detecting technique according to the present disclosure on the basis of a center-focused method based on a study showing that when a human being views an object, he or she focuses more intensely on a central portion of the object and focuses less intensely on side portions of the object.

As an age value is decreased, higher-speed updating is ensured. Thus, the background model updating engine 250 multiplies a map representing an age value of an image by a centralized map having a shape similar to that of a cross section of a pyramid.

Figure 4:
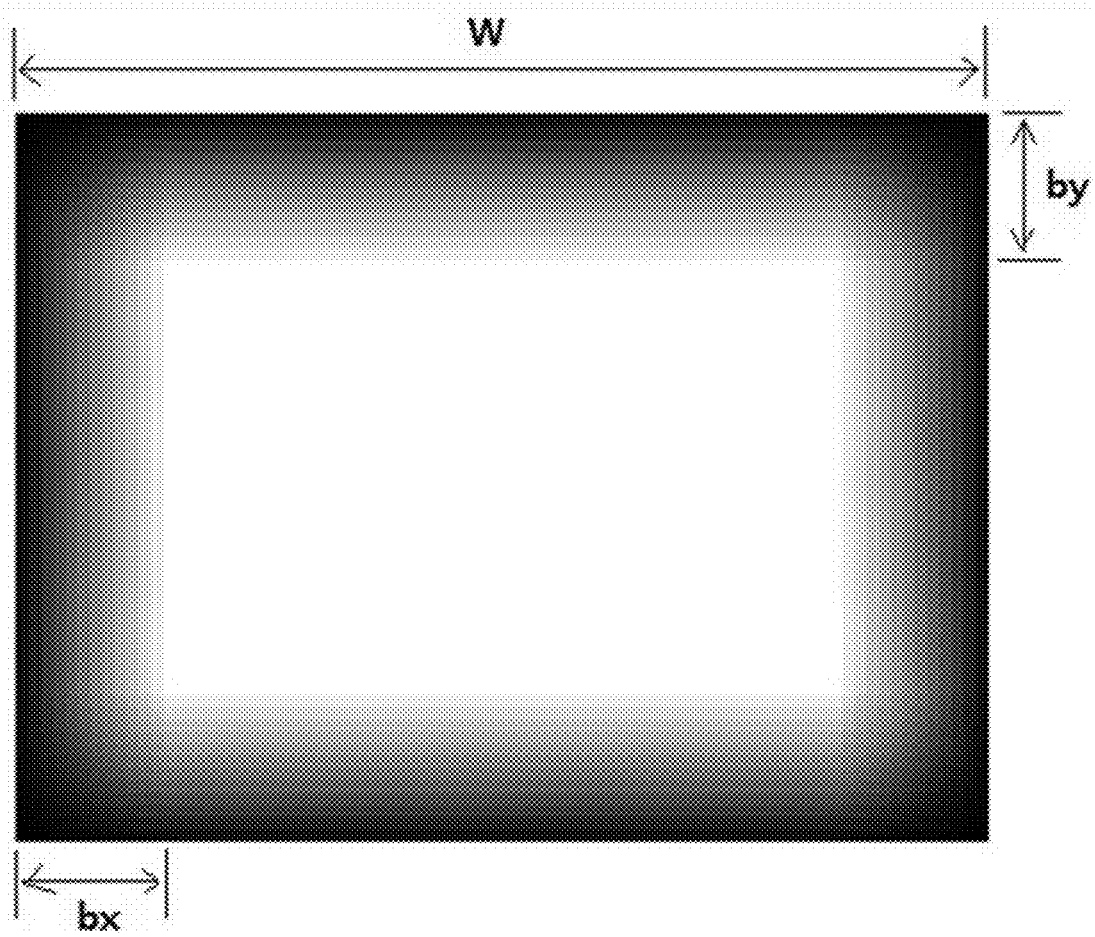
FIG. 4 is a planar graph showing a centralized map employed by a dynamic object detecting system according to an embodiment of the present disclosure.
Figure 5:
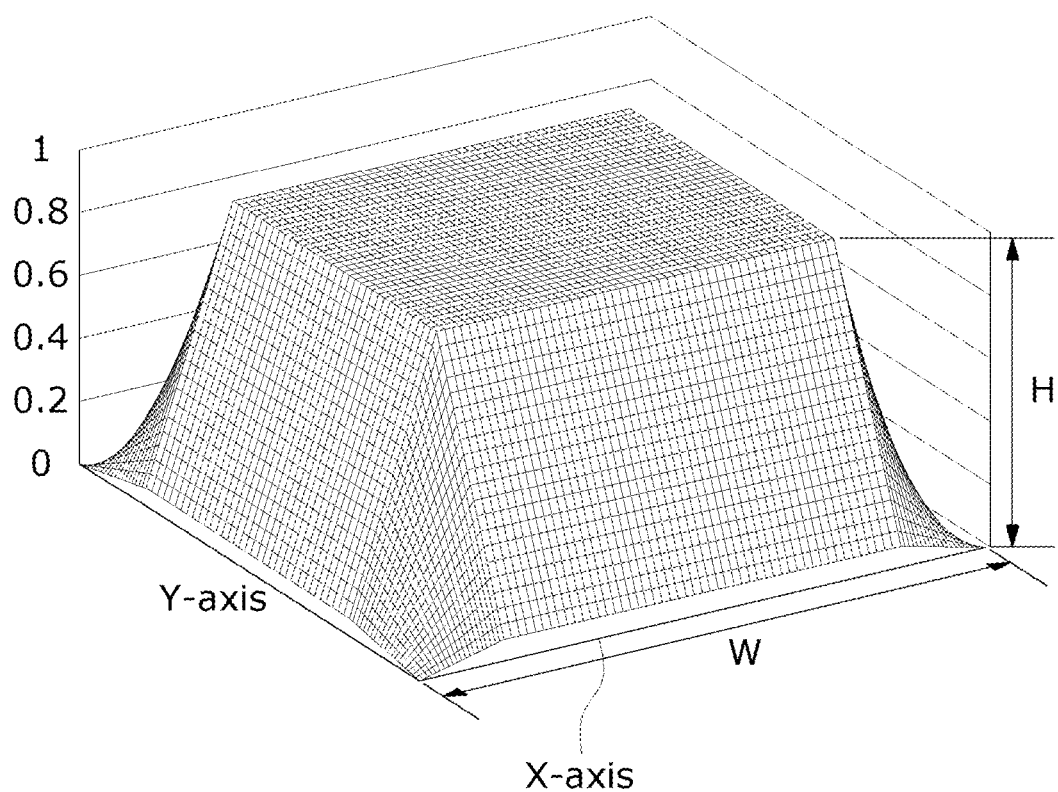
FIG. 5 is a three-dimensional (3D) graph showing the centralized map employed by the dynamic object detecting system according to an embodiment of the present disclosure.

FIG. 4 is a planar graph showing a centralized map employed by a dynamic object detecting system according to an embodiment of the present disclosure. FIG. 5 is a three-dimensional (3D) graph showing the centralized map employed by the dynamic object detecting system according to an embodiment of the present disclosure.

When explaining using formulae, the background model updating engine 250 may update the background model according to Equations 9 to 12 below $$A(p, q) = A_x(p) \times A_y(q) \quad \text{[Equation 9]}$$

$$A_x(p) = \begin{cases} p/b_x & \text{if } 0 \le p \le b_x \\ 1 & \text{if } b_x \le p \le w - b_x \\ (w-p)/b_x & \text{if } w - b_x \le p \le w \end{cases} \quad \text{[Equation 10]}$$

$$A_y(q) = \begin{cases} q/b_y & \text{if } 0 \le q \le b_y \\ 1 & \text{if } b_y \le q \le h - b_y \\ (h-q)/b_y & \text{if } h - b_y \le q \le h \end{cases} \quad \text{[Equation 11]}$$

$$\alpha_i^{(t)} \leftarrow \min(A \cdot \alpha_i^{(t)}, \alpha_{max}) \quad \text{[Equation 12]}$$

That is, when an age value $\alpha_i^{(t)}$ at a current point in time is calculated with Equation 8, the background model updating engine 250 multiplies the age value $\alpha_i^{(t)}$ by a weight A calculated with Equations 9 to 11.

In order to prevent the background model from not being updated due to an extremely high age value of the image, the background model updating engine 250 calculates the age value $\alpha_i^{(t)}$ according to Equation 12 such that a value $A \cdot \alpha_i^{(t)}$ calculated by multiplying the age value $\alpha_i^{(t)}$ by the weight A does not exceed a maximum value $\alpha_{max}$.

As described above, when the background model of the outer portion of an image is updated using the age value calculated with Equations 9 to 12, the outer portion of the image may be quickly updated and a relatively clear background may be obtained, thereby easily detecting a moving object.

If the camera motion state is the fourth state, i.e., if estimation of the motion of the camera fails, an error rate of the estimation of the motion of the camera is extremely high and thus a background may be damaged when information regarding the estimation of the motion of the camera is used for the updating of the background.

Such a failure of the estimation of the motion of the camera may occur when the relationship between two video frames is difficult to estimate, when the motion of the camera is difficult to estimate due to a sudden motion of the camera, etc.

When the estimation of the motion of the camera fails as described above, the background may be completely initialized, but in this case, a region determined as corresponding to a dynamic object is highly probable to be identified as an immovable region.

Thus, the present disclosure proposes a method of considering a failure of estimation of a motion of a camera to be temporary and preventing updating of a background of a current video frame.

That is, when the state of the motion of the camera is the fourth state, the background model updating engine 250 continuously maintains a previous background model.

Furthermore, when a background initialization command is received, the background model updating engine 250 initializes the background model and updates the background model again in a state in which a first frame after the initialization of the background model is set as a background initialization value.

The dynamic object detecting engine 260 flexibly detects a dynamic object according to the state (one of the first to fourth states) of the motion of the camera determined by the camera motion determining engine 240.

When the state of the motion of the camera is the first state, the dynamic object detecting engine 260 may calculate a value $P_{BG}$ of a probability that each pixel of the image in the video frame calculated with Equations 4 and 5 is a background by applying average and dispersion values of each pixel of the image to Equation 13 below.

$$P_{BG}(i) = \frac{1}{\sqrt{2\pi\sigma_i^{2(t)}}} \exp\left(-\frac{1}{2}\frac{(I_i^{(t)} - \mu_i^{(t)})^2}{\sigma_i^{2(t)}}\right) \quad \text{[Equation 13]}$$

Here, $I_i^{(t)}$ denotes an input current brightness value, $\mu_i^{(t)}$ denotes an current average brightness value, and $\sigma_i^{2(t)}$ denotes dispersion of the current brightness value.

However, since a large number of operations are needed to calculate an exponential function as shown in Equation 13, the dynamic object detecting engine 260 detects and separates a dynamic object by approximating the exponential function.

That is, as shown in Equation 14 below, the dynamic object detecting engine 260 compares a variable $$\frac{(I_i^{(t)} - \mu_i^{(t)})^2}{\sigma_i^{2(t)}}$$

included in the exponential function of Equation 13 with a threshold value T and identifies a corresponding pixel as a part of a dynamic object when the variable $$\frac{(I_i^{(t)} - \mu_i^{(t)})^2}{\sigma_i^{2(t)}}$$

is greater the threshold value T.

$$F_i^{(t)} = \begin{cases} \text{foreground} & \text{if } \frac{(I_i^{(t)} - \mu_i^{(t)})^2}{\sigma_i^{2(t)}}, \\ \text{background} & \text{otherwise} \end{cases} \quad [\text{Equation 14}]$$

wherein $F_i^{(t)}$ denotes a state value indicating whether a pixel corresponds to a background or a dynamic object.

Similarly, when the state of the motion of the camera is the second or third state, the dynamic object detecting engine 260 detects a dynamic object on the basis of Equations 13 and 14.

However, since a global motion estimation error is not considered in Equations 13 and 14, if the camera motion state is the second state or the third state, a large number of errors may occur at an outline of an image when a dynamic object is detected by directly applying Equations 13 and 14.

To solve this problem, when the camera motion state is the second state or the third state, the dynamic object detecting engine 260 identifies whether a pixel corresponds to a background or a dynamic object by taking into account neighboring pixels of the pixel.

In this case, the dynamic object detecting engine 260 may identify whether the pixel corresponds to a background or a dynamic object by taking into account a matching error.

For convenience of explanation, it is assumed that an image of a pixel Xc in a video frame at a point in time t is moved to a pixel Vx in the video frame at a point in time (t+1) due to a global motion of the camera.

When the dynamic object detecting engine 260 identifies whether the pixel Xc corresponds to a background or a dynamic object on the basis of the above assumption, the pixel Xc is compared, in consideration of a matching error, with not only the pixel Xb, but also pixels adjacent to the pixel Xb to identify whether the pixel Xc corresponds to a background or a dynamic object.

When explaining using formulae, the dynamic object detecting engine 260 identifies whether a pixel in a video frame corresponds to a background or a dynamic object on the basis of Equations 15 and 16 below.

$$D_{X_c, X_i} = \frac{1}{\sigma^2(X_i)} (I(X_c) - \mu(X_i))^2 \quad [\text{Equation 15}]$$

$$F_{X_c}^{(t)} = \begin{cases} \text{Background} & \text{if } \min[D_{X_c, X_i}] < T_c \\ \text{Foreground} & \text{otherwise} \end{cases}, \quad [\text{Equation 16}]$$

(Here, $X_i \in N(X_c)$)

Here, Xc denotes a position of a pixel, at which whether the pixel corresponds to a background or a dynamic object is identified, $X_i$ denotes a position of a pixel adjacent to the pixel Xc in a background image, $D_{X_c, X_i}$ denotes the distance between the pixel Xc and the pixel $X_i$, $F_{X_c}^{(t)}$ denotes a state value indicating whether the pixel Xc corresponds to a background or a dynamic object, and $T_C$ denotes a threshold value for differentiating between a background and a dynamic object.

That is, the dynamic object detecting engine 260 may identify a pixel to be detected as a background when a minimum value among the difference values between a position of the pixel and positions of pixels adjacent to the pixel is less than a threshold value and identify the pixel as a dynamic object when the minimum value is greater than or equal to the threshold value.

Figure 6A:
Figure 6B:
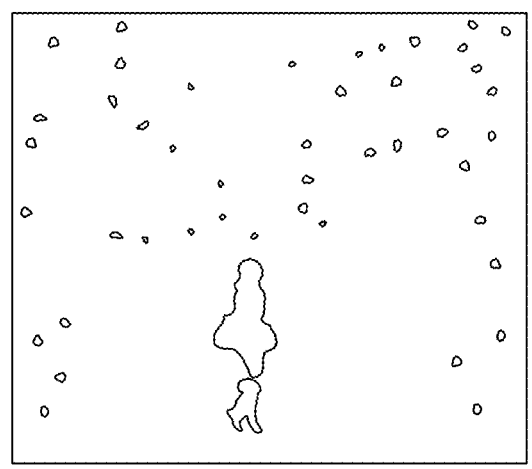
Figure 6C:
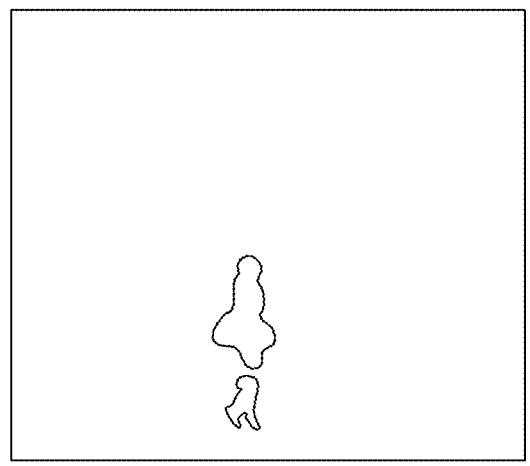

FIGS. 6A to 6C are diagrams illustrating a state in which noise is removed when a dynamic object is detected in consideration of a matching error, the detection performed by a dynamic object detecting system according to an embodiment of the present disclosure. FIG. 6A illustrates an input image. FIG. 6B illustrates a result of detecting a dynamic object without removing noise related to the matching error. FIG. 6C illustrates a result of detecting a dynamic object after removing the noise related to the matching error.

As described above, when the dynamic object detecting engine 260 detects a dynamic object using Equations 15 and 16 above, a large amount of noise related to the matching error may be removed as illustrated in FIGS. 6A to 6C.

When Equations 15 and 16 above are used to detect a dynamic object, a large amount of noise related to the matching error may be removed but parts of an object which has a color similar to that of a background or is slowing moving and thus a change thereof is difficult to detect may be damaged during the removing of the noise.

To prevent the occurrence of this problem, the present disclosure uses a method of preventing damage to parts of an image which are highly probable to be parts of an object on the basis of the durability of an object probability and a shape analysis-based object probability.

Accordingly, the dynamic object detecting engine 260 detects a dynamic object by performing updating in a way similar to a background updating method by calculating an object probability value $L_{FG}(j)$ with Equation 17 below.

$$L_{FG}(j) = \frac{(I_j^{(t)} - \mu_i^{(t)})^2}{\sigma_i^{2(t)}} \quad [\text{Equation 17}]$$

The dynamic object detecting engine 260 may verify an object region again by applying the object region to a sorter which verifies whether a target is an object by using only shape information regardless of whether the target is moving.

For example, the dynamic object detecting engine 260 may use a sorter which uses an analysis of features of an object having a closed outline (a 'shape analysis'), a sorter trained using deep learning to recognize general object features, or the like.

Shape analysis-based object detection is a method of detecting an object by separating the object and noise. When a deep learning-based object detecting method is used, an object can be identified.

The dynamic object detecting engine 260 detects a region of an image which is probably an object by using an object probability value and provides information regarding this region ('probable object region information') to the background model updating engine 250.

As described above, when the dynamic object detecting engine 260 provides the probable object region information to the background model updating engine 250, the background model updating engine 250 does not perform background updating on a region corresponding to the probable object region information.

Since background updating is not performed on the region corresponding to the probable object region information, a background may be prevented from being damaged due to inclusion of a dynamic object in a background model.

Figure 7A:
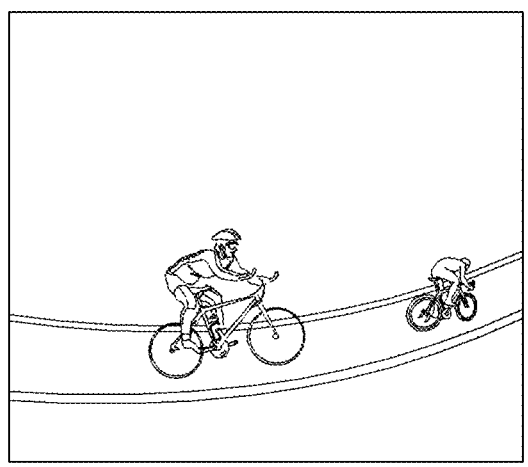
Figure 7B:
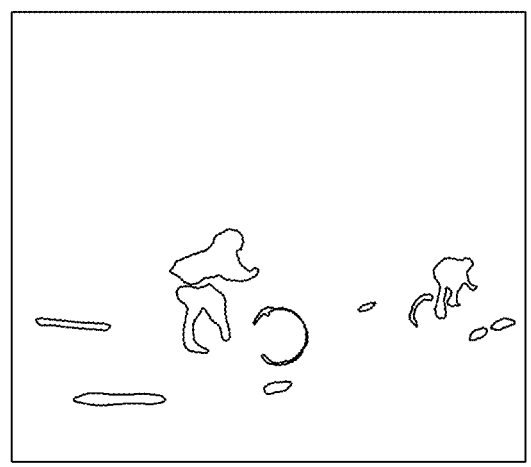
Figure 7C:
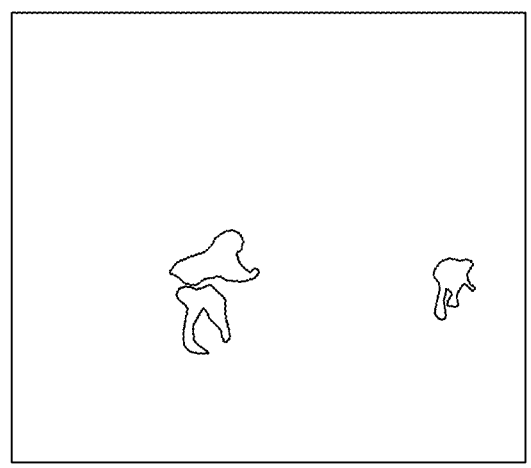

FIGS. 7A to 7C are diagrams illustrating an example of results of detecting a dynamic object from an input image before and after a dynamic object detecting technique according to an embodiment of the present disclosure is applied, in which FIG. 7A illustrates the input image, FIG. 7B illustrates a result of detecting a dynamic object from the input image before the dynamic object detecting technique is applied, and FIG. 7C illustrates a result of detecting a dynamic object from the input image after the dynamic object detecting technique is applied.

Figure 8A:
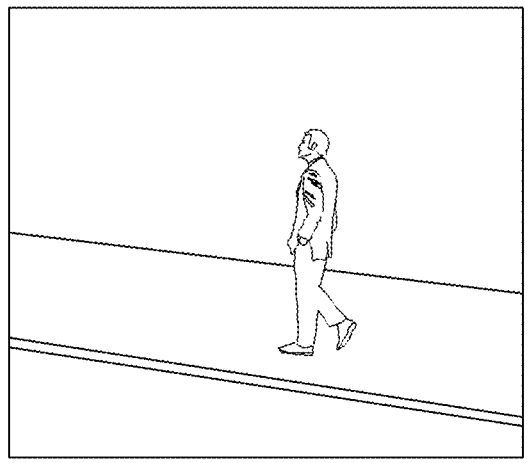
Figure 8B:
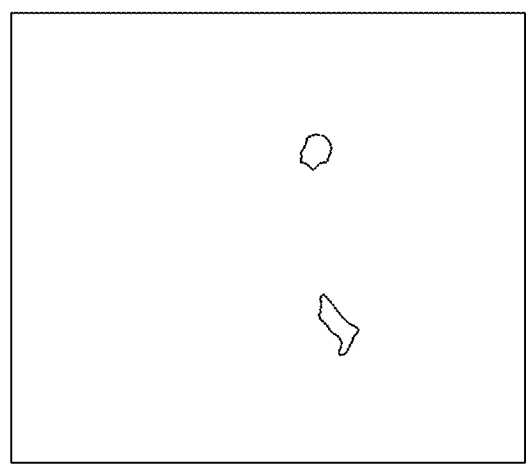
Figure 8C:
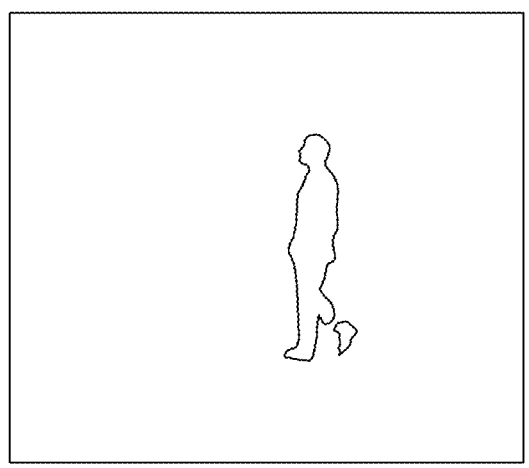

FIGS. 8A to 8C are diagrams illustrating another example of results of detecting a dynamic object from an input image before and after a dynamic object detecting technique according to an embodiment of the present disclosure is applied, in which FIG. 8A illustrates the input image, FIG. 8B illustrates a result of detecting a dynamic object from the input image before the dynamic object detecting technique is applied, and FIG. 8C illustrates a result of detecting a dynamic object from the input image after the dynamic object detecting technique is applied.

As illustrated in FIGS. 7A to 8C, when the dynamic object detecting technique according to an embodiment of the present disclosure is used, a dynamic object may be more clearly detected from an input image.

The structures of and operations of the components of the dynamic object detecting system according to an embodiment of the present disclosure have been described above. A dynamic object detecting method performed by the dynamic object detecting system according to an embodiment of the present disclosure will be described below.

Figure 9:
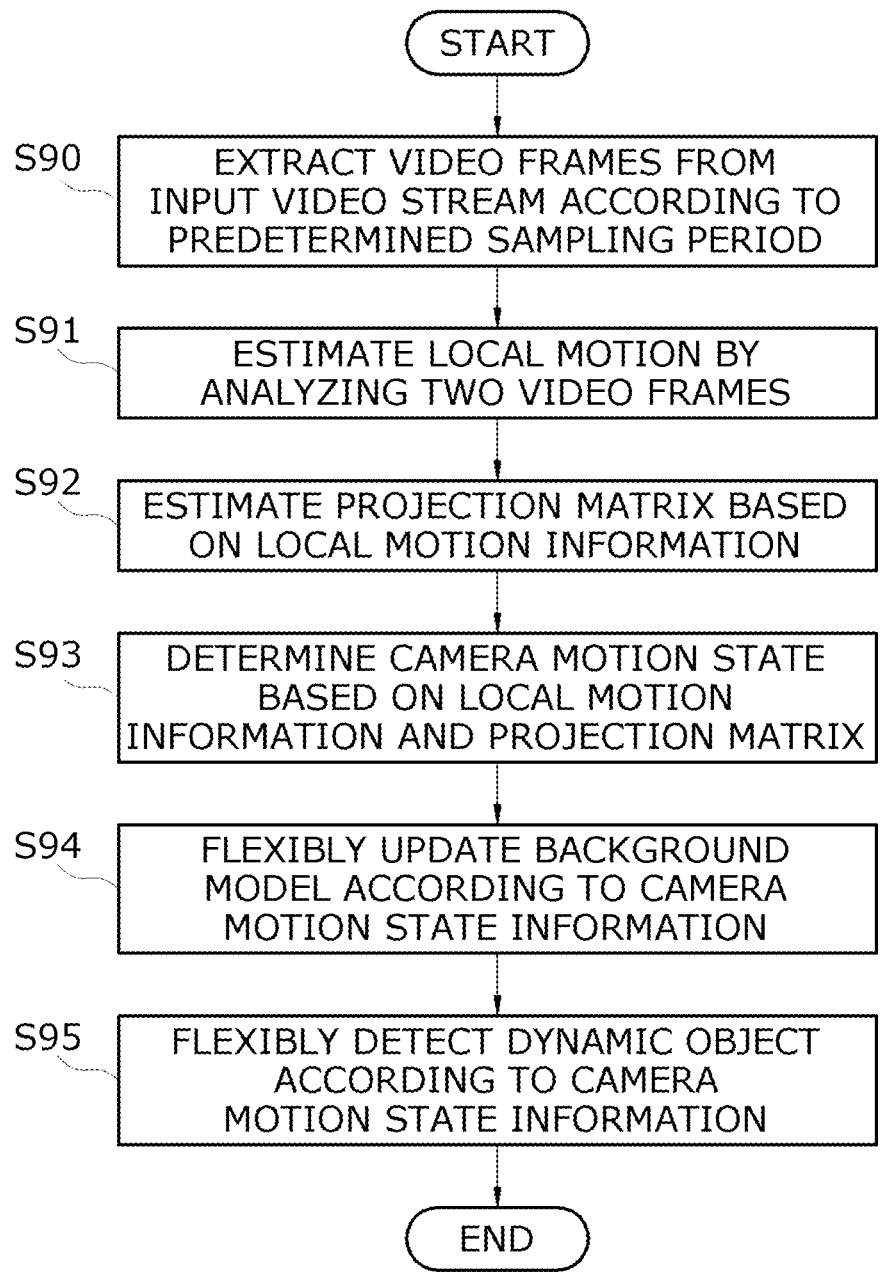
FIG. 9 is a flowchart of a dynamic object detecting method performed by a dynamic object detecting system according to an embodiment of the present disclosure.

FIG. 9 is a flowchart of a dynamic object detecting method performed by a dynamic object detecting system according to an embodiment of the present disclosure.

Operations illustrated in FIG. 9 may be performed by the dynamic object detecting system 1 described above with reference to FIGS. 1 to 8c. The video extracting engine 210 of the dynamic object detecting system 1 extracts video frames from a video stream input from a camera according to a predetermined sampling period (operation S90).

The video frames extracted in operation S90 are output to the local motion estimating engine 220 and the background model updating engine 250.

After operation S90, the local motion estimating engine 220 of the dynamic object detecting system 1 estimates a local motion by analyzing two video frames input thereto (operation S91).

For example, in operation S91, the local motion estimating engine 220 may estimate a local motion by using a feature tracking algorithm.

Alternatively, in operation S91, the local motion estimating engine 220 may estimate a local motion by comparing a brightness value of an image at first coordinates on a first video frame captured at a point in time t with that of an image at second coordinates on a second video frame captured at a point in time (t+1), wherein the image at the first coordinates is moved to the second coordinates for a sampling period.

Information regarding the local motion estimated in operation S91 is output to the global motion estimating engine 230 and the camera motion determining engine 240.

After operation S91, the global motion estimating engine 230 of the dynamic object detecting system 1 estimates a projection matrix which is information regarding a global motion (or a motion of the camera) on the basis of the information regarding the local motion input thereto (operation S92).

The projection matrix (global motion information or camera motion information, hereinafter referred to as the 'projection matrix') estimated in operation S92 is output to the camera motion determining engine 240.

After operation S92, in operation S93, the camera motion determining engine 240 of the dynamic object detecting system 1 determines a state of a motion of the camera on the basis of the information regarding the local motion and the projection matrix.

Information regarding the state of the motion of the camera determined in operation S93 is output to the background model updating engine 250.

The camera motion determining engine 240 determines the state of the motion of the camera according to the flowchart of FIG. 3 (operation S93).

The camera motion determining engine 240 is operated according to the flowchart of FIG. 3 to determine the state of the motion of the camera to be one of first to fourth states.

After operation S93, the background model updating engine 250 of the dynamic object detecting system 1 flexibly updates a background model according to the information regarding the state of the motion of the camera input thereto (operation S94).

In operation S94, when the state of the motion of the camera is the first state, the background model updating engine 250 may update the background model by using a background modeling algorithm using a Gaussian distribution but embodiments are not limited thereto.

In this case, the background model updating engine 250 may update the background model on the basis of a current average brightness value and dispersion thereof which are calculated by applying a fixed learning rate.

In operation S94, when the state of the motion of the camera is the second state, the background model updating engine 250 updates the background model on the basis of a current average brightness value and dispersion thereof which are calculated by applying, as a learning rate, a reciprocal of an age value of a newly appearing image in the video frame.

In operation S94, when the state of the motion of the camera is the third state, the background model updating engine 250 updates the background model by changing an outer portion of the image on the basis of a degree of divergence of the local motion.

In operation S94, when the state of the motion of the camera is the fourth state, the background model updating engine 250 maintains a previous background model.

After operation S94, the dynamic object detecting engine 260 of the dynamic object detecting system 1 flexibly detects a dynamic object according to the information regarding the state of the motion of the camera (operation S95).

In operation S95, if the state of the motion of the camera is the first state, when the difference between an input current value and a previous value is greater than a threshold value, the dynamic object detecting engine 260 identifies a corresponding pixel as a part of a dynamic object by using a background model of each pixel.

For example, when the background model updating engine 250 updates the background model using the background modeling algorithm using the Gaussian distribution, the dynamic object detecting engine 260 calculates a value of a probability that each pixel corresponds to a background by using an average value and a dispersion value of each pixel, comparing the value of the probability with a threshold value, and identifying whether a corresponding pixel corresponds to a dynamic object when the value of the probability is greater than the threshold value.

In this case, in order to reduce the amount of calculation, the dynamic object detecting engine 260 may approximate the value of the probability and then compare the approximated value with the threshold value.

In operation S95, if the state of the motion of the camera is the second or third state, when the difference between an input current value and a previous value is greater than a threshold value, the dynamic object detecting engine 260 identifies a corresponding pixel as a part of a dynamic object by using a background model thereof.

In addition, the dynamic object detecting engine 260 may detect a dynamic object by taking into consideration pixels adjacent to the corresponding pixel.

For example, the dynamic object detecting engine 260 identifies a pixel to be detected as corresponding to a dynamic object when a minimum value among the difference values between a position of the pixel and positions of pixels adjacent to the pixel is greater than or equal to a threshold value.

According to the above-described dynamic object detecting technique suggested herein, a dynamic object can be detected after a background model is flexibly updated according to a state of a motion of a camera determined on the basis of a video captured by a dynamic camera.

Accordingly, a background model updating method and a dynamic object detecting method can vary according to the state of the motion of the camera and thus a dynamic object can be optimally detected according to various camera motions.

Furthermore, the dynamic object detecting technique suggested herein is applicable to various areas, including a broadcasting camera video for sports broadcasting, a surveillance camera video for a surveillance purpose, a camera attached to a vehicle, etc.

Even if all components of each of the above-described embodiments of the present disclosure are described as being integrated into a single unit, or as being operated while being combined with one another, the present disclosure is not limited to the embodiments. That is, at least one among all the components may be selectively combined and operated within the scope of the present disclosure. Each of all the components may be embodied as an independent hardware component or some or all of the components may be selectively combined to embody a computer program having program modules performing some or all of functions of a combination of one or more hardware components. An embodiment of the present disclosure may be implemented when such a computer program is stored in a computer-readable medium, such as a Universal Serial Bus (USB) memory, a compact disc (CD), or a flash memory, and is read and executed by a computer. Examples of a recording medium on which the computer program may be recorded may include a magnetic recording medium, an optical recording medium, a carrier wave medium, etc.

While embodiments of a dynamic object detecting system and method according to the present disclosure have been described above, the scope of the present disclosure is not limited thereto and various alternatives, modifications, and changes may be made therein within a range obvious to those of ordinary skill in the art related to the present disclosure.

Accordingly, the embodiments set forth herein and the accompanying drawings are not intended to restrict the technical scope of the present disclosure but are provided to explain the technical scope of the present disclosure. Thus, the scope of the technical idea of the present disclosure is not limited by these embodiments and the drawings. The scope of the present disclosure to be protected should be defined by the claims and all technical ideas within a range equivalent to the scope of the present disclosure should be construed as falling within the scope of the present disclosure.

What is claimed is:

1. A dynamic object detecting system comprising:
at least one memory storing a program; and
at least one processor configured to be operated according to the program stored in the memory,
wherein the processor comprises:
a video extracting engine configured to extract video frames from an input video stream according to a sampling period;
a local motion estimating engine configured to estimate a local motion by analyzing two video frames from the video extracting engine;
a global motion estimating engine configured to estimate a projection matrix on the basis of information regarding the local motion from the local motion estimating engine;
a camera motion determining engine configured to determine a state of a motion of a camera on the basis of the information regarding the local motion and the projection matrix;
a background model updating engine configured to update a background model according to camera motion state information from the camera motion determining engine; and
a dynamic object detecting engine configured to detect a dynamic object from the video frames according to the camera motion state information,
wherein the camera motion state information comprises at least one of a stopped state, a horizontal or vertical movement state, a forward or backward movement state, and a failure of an estimation of the motion of the camera, wherein the stopped state is a first state, the horizontal or vertical movement state is a second state, the forward or backward movement state is a third state, and the failure of the estimation of the motion of the camera is a fourth state,
wherein, when the state of the motion of the camera is the fourth state, the background model updating engine maintains a previous background model.

2. The dynamic object detecting system of claim 1, wherein the local motion estimating engine estimates the local motion by comparing a brightness value of an image on first coordinates on a first video frame captured at a point in time t with that of an image on second coordinates on a second video frame captured at a point in time (t+1), the first coordinates being moved to the second coordinates for the sampling period.

3. The dynamic object detecting system of claim 2, wherein the camera motion determining engine calculates a ratio between an area of an image which is not included in the first video frame but newly appears in the second video frame and an entire image area and determines that the camera is in the first state when the calculated ratio is equal to or less than a predetermined reference ratio.

4. The dynamic object detecting system of claim 3, wherein, when the calculated ratio is greater than the predetermined reference ratio, the camera motion determining engine determines the camera is moved in a horizontal direction or a vertical direction by determining whether the newly appearing image is located at an upper, lower, left, or right portion of the video frames.

5. The dynamic object detecting system of claim 1, wherein the camera motion determining engine calculates an error of the projection matrix, compares the error with a threshold value, and analyzes the projection matrix and determines whether the camera is in the stopped state or is in the horizontal or vertical movement state when the error is equal to or less than the threshold value.

6. The dynamic object detecting system of claim 5, wherein, when the error is greater than the threshold value, the camera motion determining engine determines whether the camera is in the forward or backward movement state or whether the estimation of the motion of the camera fails on the basis of a result of determining a degree of divergence by analyzing the local motion.

7. The dynamic object detecting system of claim 6, wherein, when a case in which the state of the motion of the camera is the fourth state repeatedly occurs for a predetermined time or in a predetermined number of frames or more, the camera motion determining engine transmits a background initialization command to the background model updating engine.

8. The dynamic object detecting system of claim 1, wherein, when the state of the motion of the camera is the first state, the background model updating engine updates the background model on the basis of a current average brightness value and dispersion thereof which are calculated by applying a fixed learning rate.

9. The dynamic object detecting system of claim 1, wherein, when the state of the motion of the camera is the second state, the background model updating engine updates the background model on the basis of a current average brightness value and dispersion thereof which are calculated by applying, as a learning rate, a reciprocal of an age value of an image newly appearing in the video frames.

10. The dynamic object detecting system of claim 1, wherein, when the state of the motion of the camera is the third state, the background model updating engine updates the background model by changing an outer portion of an image using a degree of divergence of the local motion.

11. The dynamic object detecting system of claim 1, wherein, when a background initialization command is received from the camera motion determining engine, the background model updating engine initializes the background model and updates the background model again in a state in which a first video frame after the initialization of the background model is set to an initial background value.

12. The dynamic object detecting system of claim 1, wherein, when the state of the motion of the camera is the first state, the dynamic object detecting engine identifies a corresponding pixel as a part of a dynamic object by using a background model of each pixel of the video frames when a difference between an input current value and a previous value is greater than a threshold value.

13. The dynamic object detecting system of claim 1, wherein, when the state of the motion of the camera is the second or third state, the dynamic object detecting engine identifies a corresponding pixel as a part of a dynamic object by using a background model of each pixel of the video frames when a difference between an input current value and a previous value is greater than a threshold value, and identifies a pixel to be detected as corresponding to a dynamic object when a minimum value among difference values between a position of the pixel to be detected and positions of pixels adjacent to the pixel to be detected is greater than or equal to a threshold value.

14. A dynamic object detecting method performed by a processor operated according to a dynamic object detecting program stored in at least one memory, the dynamic object detecting method comprising:
    extracting video frames from an input video stream according to a sampling period;
    estimating a local motion by analyzing two video frames among the extracted video frames;
    estimating a projection matrix on the basis of information regarding the estimated local motion;
    determining a state of a motion of a camera on the basis of the information regarding the estimated local motion and the projection matrix;
    updating a background model on the basis of information regarding the determined state of the motion of the camera; and
    detecting a dynamic object from the video frames on the basis of the information regarding the determined state of the motion of the camera,
    wherein the determining of the state of the motion of the camera comprises determining the state of the motion of the camera to be a stopped state or a horizontal or vertical movement state on the basis of a result of analyzing the projection matrix when an error of the projection matrix is equal to or less than a threshold value, and determining the state of the motion of the camera is in a forward or backward movement state or determining that estimation of the motion of the camera fails on the basis of a result of analyzing the local motion when the error is greater than the threshold value, and wherein the stopped state is a first state, the horizontal or vertical movement state is a second state, the forward or backward movement state is a third state, and the failure of the estimation of the motion of the camera is a fourth state.

15. The dynamic object detecting method of claim 14, wherein the determining of the state of the motion of the camera comprises calculating a ratio between an area of an image which is not included in a first video frame but newly appearing in a second video frame and an entire image area according to a result of analyzing the projection matrix, determining the state of the motion of the camera to be the first state when the calculated ratio is equal to or greater than a predetermined reference ratio, and determining the state of the motion of the camera to be the second state when the calculated ratio is greater than the reference ratio.

16. The dynamic object detecting method of claim 14, wherein the determining of the state of the motion of the camera comprises determining a degree of divergence by analyzing the local motion and determining whether the state of the motion of the camera is the third state or the fourth state on the basis of the determined degree of divergence.

17. The dynamic object detecting method of claim 14, wherein the updating of the background model comprises updating the background model on the basis of a current average brightness value and dispersion thereof, which are calculated by applying a fixed learning rate when the state of the motion of the camera is the first state, updating the background model on the basis of a current average brightness value and dispersion thereof which are calculated by applying, as a learning rate, a reciprocal of an age value of an image newly appearing in the video frames when the state of the motion of the camera is the second state, and updating the background model by changing an outer portion of an image on the basis of a degree of divergence of the local motion when the state of the motion of the camera is the third state.

18. The dynamic object detecting method of claim 14, wherein, when the state of the motion of the camera is one of the first to third states, the detecting of the dynamic object comprises identifying a corresponding pixel as a part of the dynamic object by using a background model of each pixel in the video frame when the difference between an input current value and a previous value is greater than a threshold value.

* * * * *